US006731995B2

(12) United States Patent
Takeuchi

(10) Patent No.: US 6,731,995 B2
(45) Date of Patent: May 4, 2004

(54) PRODUCTION CONTROL SYSTEM

(75) Inventor: Kunihiko Takeuchi, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 138 days.

(21) Appl. No.: 09/863,356

(22) Filed: May 24, 2001

(65) Prior Publication Data

US 2001/0049567 A1 Dec. 6, 2001

(30) Foreign Application Priority Data

Jun. 6, 2000 (JP) ........................................ 2000-169640
Apr. 2, 2001 (JP) ........................................ 2001-103096

(51) Int. Cl.[7] ........................... G06F 19/00; G06F 15/16
(52) U.S. Cl. ............................. 700/96; 700/19; 700/95; 700/180; 709/100; 709/203
(58) Field of Search ................................. 700/96, 9, 18, 700/19, 95, 83, 117, 180; 709/100, 203

(56) References Cited

U.S. PATENT DOCUMENTS

| 5,089,970 | A | * | 2/1992 | Lee et al. ...................... 700/96 |
| 5,134,575 | A | * | 7/1992 | Takagi .......................... 700/86 |
| 5,231,585 | A | * | 7/1993 | Kobayashi et al. ............ 700/96 |
| 5,805,442 | A | * | 9/1998 | Crater et al. .................... 700/9 |
| 6,038,486 | A | * | 3/2000 | Saitoh et al. .................. 700/96 |
| 6,246,920 | B1 | * | 6/2001 | Mizuno et al. ............. 700/159 |
| 6,438,444 | B1 | * | 8/2002 | Mizuno et al. ............. 700/169 |
| 6,477,437 | B1 | * | 11/2002 | Hirota .......................... 700/95 |
| 6,633,787 | B1 | * | 10/2003 | Sekitani ....................... 700/96 |

OTHER PUBLICATIONS

Patent Abstract of Japan, Publication No. 11–123630, date May 11, 1999.

* cited by examiner

Primary Examiner—Leo Picard
Assistant Examiner—Paul Rodriguez
(74) Attorney, Agent, or Firm—Westerman, Hattori, Daniels & Adrian, LLP

(57) ABSTRACT

The present invention provides a production control system which ensures easy storage and management of information, and prompt and proper retrieval of necessary information in production sites. The production control system comprises a plurality of terminals provided in production sites and a central processor (5) connected to the terminals via a network (2). The central processor (5) comprises a production control information storage section (7,8,9) which stores information on production control, and a data distributing section (6) for retrieving production control information from the production control information storage section (7,8,9) in response to a request from any of the terminals and transmitting the retrieved production control information to the terminal having requested the information. The production control system can centrally manage the production control information on a paperless basis, and promptly and properly retrieve the necessary production control information.

3 Claims, 8 Drawing Sheets

```
        MENU

1. PRODUCTION INSTRUCTIONS
2. PROCESS SPECIFICATIONS
3. CHECK SHEETS
4. TEST CUTTING PROGRAM
5. RUNNING OPERATION PROGRAM
```

PRODUCTION INSTRUCTION

| Production Instruction | | | | |
|---|---|---|---|---|
| Issue Date | | Approval | | Preparation |
| 2000/5/19 | | **** | | **** |

| Machine Model | Code No. | |
|---|---|---|
| ABC/abc | 2000050564 | |

| Process | Date and Time of Completion | | Person in Charge | Employee Code | Completion |
|---|---|---|---|---|---|
| FAA | 2000/5/19 | 17:00 | **** | **** | 2000/5/19 |
| ACT | 2000/5/22 | 17:00 | **** | **** | 2000/5/22 |
| COV | 2000/5/23 | 17:00 | **** | **** | 2000/5/23 |
| CHK | 2000/5/24 | 17:00 | **** | **** | 2000/5/24 |

FIG. 5

| PROCESS SPECIFICATIONS |
|---|

PROCESS LIST

1. WIRING
2. ON-SITE ADJUSTMENT
3. INSPECTION FOR ACCURACY
4. MOUNTING OF COVER
5. MOUNTING OF CHUCK
6. CUTTING TEST
7. LASER MEASUREMENT
   7-1. MEASUREMENT OF LINEAR AXIS POSITIONING ACCURACY
   7-2. MEASUREMENT OF ROTATION AXIS POSITIONING ACCURACY
8. MOUNTING OF OPTIONAL COMPONENTS
9. INSPECTION OF PRODUCT
10. DELIVERY INSPECTION
11. DELIVERY

FIG. 6

1. ELECTRICAL WIRING

| PROCESS SPECIFICATION | | MANAGEMENT No. | *＊－＊＊ | WORKING SITE |
|---|---|---|---|---|
| MACHINE MODEL | ALL MODELS | PROCESS NAME | ELECTRICAL WIRING | ＊＊PLANT LATHE ASSEMBLING LINE |
| PROCESS No. | | OPERATOR | EXPOSED WIRE LENGTH WITH TERMINAL BASE | |

OPERATING STEP/PROCEDURE (2/2)

EXPLANATION OF PRODUCT AND OPERATION METHOD

REMOVAL

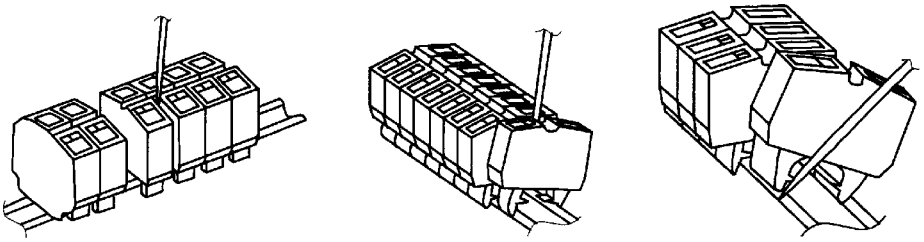

Slide earth terminal base to be removed and separate terminal base from other terminal bases.

Remove earth terminal base from rail.

Remove earth terminal base.

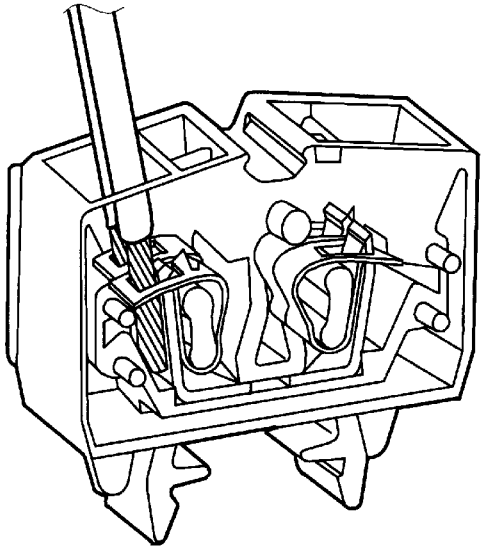

COMMONIZATION

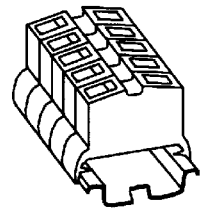

Commonization with jumper

CAGE-CLAMP CONNECTION

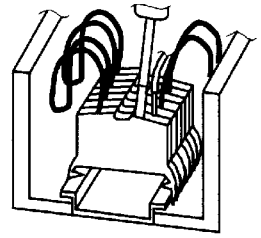

Connection of wires

FIG. 8

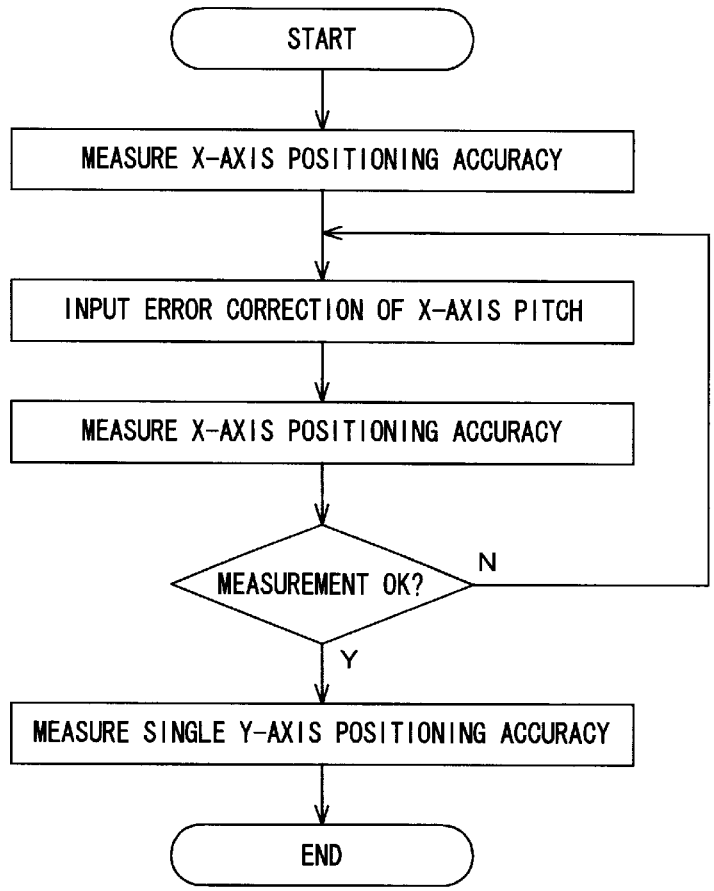

7. LASER MEASUREMENT 7-1. MEASUREMENT OF LINEAR AXIS POSITIONING ACCURACY

| PROCESS SPECIFICATION | | MANAGEMENT No. | - | WORKING SITE | |
|---|---|---|---|---|---|
| MACHINE MODEL | ALL MODELS | PROCESS NAME | MEASUREMENT OF LINEAR AXIS POSITIONING ACCURACY | **PLANT LATHE ASSEMBLING LINE | |
| PROCESS No. | | OPERATOR | LASER MEASUREMENT | | |

OPERATING STEP/PROCEDURE (9/14)

9. PROCEDURE FOR MEASUREMENT OF COMBINED Y-AXIS POSITIONING ACCURACY
   ① MEASUREMENT OF X-AXIS POSITIONING ACCURACY

Measurement of X-axis positioning accuracy is performed

FIG. 9

7. LASER MEASUREMENT
7-2. MEASUREMENT OF ROTATION AXIS POSITIONING ACCURACY

| PROCESS SPECIFICATION | | | MANAGEMENT No. | - | WORKING SITE |
|---|---|---|---|---|---|
| MACHINE MODEL | ALL MODELS | PROCESS NAME | MEASUREMENT OF ROTATION AXIS POSITIONING ACCURACY | | **PLANT LATHE ASSEMBLING LINE |
| PROCESS No. | | OPERATOR | LASER MEASUREMENT OF ROTATION AXIS | | |

OPERATING STEP/PROCEDURE (1/17)

1. PROCEDURE FOR LASER MEASUREMENT OF ROTATION AXIS 1-1 COMPONENTS OF SYSTEM

① ML10 laser unit (laser source unit)
   ② RX10 and angular reflection mirror prism (to be directly attached to measurement rotation axis)
   ③ Angular interferometer prism (to be provided between ML10 and RX10)
   ④ RX10 controller (for RX10 power supply and control)
   ⑤ Personal computer

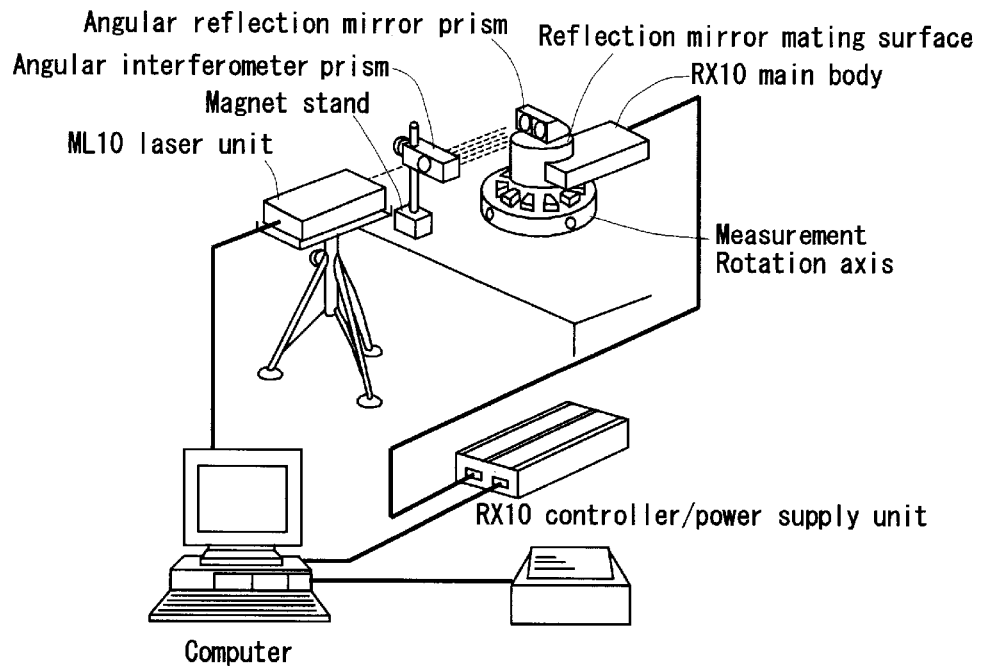

FIG. 10

| CHECK SHEET | | | | | |
|---|---|---|---|---|---|
| PROCESS NAME | No. | YEAR/MONTH/DATE | REVISION | PREPARATION | APPROVAL |
| CUTTING TEST & LASER MEASUREMENT | 8 | 1999/06/19 | ADDITION OF UNITS | **** | **** |
| MODEL ABC/abc | 9 | 1999/09/10 | ALTERATION OF MACHINE MODEL NAME | **** | **** |
| MANAGEMENT No. NC-CUT04-10 | 10 | 2000/04/10 | ALTERATION OF TOLERANCE | **** | **** |

[FrontPage RESULT STORAGE COMPONENT]

| MODEL NAME | ABC/abc | CODE No. | 2000050564 |
|---|---|---|---|
| DELIVERED TO: | **** CO. | MACHINE No. | |
| INSPECTION FOR ROTATION AXIS POSITIONING ACCURACY | OPERATOR | DATE OF INSPECTION | |
| INSPECTION FOR LINEAR AXIS POSITIONING ACCURACY | OPERATOR | DATE OF INSPECTION | |
| INSPECTION FOR MACHINING ACCURACY | OPERATOR | DATE OF INSPECTION | |

【INSPECTION FOR POSITIONING ACCURACY】 (LASER MEASUREMENT) — A

| INSPECTION ITEM | MEASURING DEVICE | MEASUREMENT AXIS | TOLERANCE | MEASURED VALUE | |
|---|---|---|---|---|---|
| POSITIONING ACCURACY FOR LINEAR MOTION | LASER MEASUREMENT DEVICE | X | WITHIN 7 $\mu$m | | $\mu$m |
| | | Z | WITHIN 10 $\mu$m (/700) WITHIN 20 $\mu$m (/1500) | | $\mu$m |
| AMOUNT OF BACKLASH CORRECTION (RAPID FEED) | LASER MEASUREMENT DEVICE | X | WITHIN 60 $\mu$m | | $\mu$m |
| | | Z | WITHIN 20 $\mu$m | | $\mu$m |
| AMOUNT OF BACKLASH CORRECTION (CUTTING FEED) | LASER MEASUREMENT DEVICE | X | WITHIN 60 $\mu$m | | $\mu$m |
| | | Z | WITHIN 20 $\mu$m | | $\mu$m |
| POSITIONING ACCURACY FOR ROTATIONAL MOTION | LASER MEASUREMENT DEVICE | PRIMARY SPINDLE | WITHIN 40" (AMC) WITHIN 50" (BMC) | | (s) |
| AMOUNT OF BACKLASH CORRECTION (C-AXIS) | | RAPID FEED | WITHIN 18" (AMC) WITHIN 540" (BMC) | | (s) |
| | | CUTTING FEED | WITHIN 18" (AMC) WITHIN 540" (BMC) | | (s) |
| REPEATED POSITIONING ACCURACY FOR LINEAR MOTION | LASER MEASUREMENT DEVICE | X | WITHIN 7 $\mu$ | | $\mu$m |
| | | Z | WITHIN 9 $\mu$m (/700) WITHIN 15 $\mu$m (/1500) | | $\mu$m |
| REPEATED POSITIONING ACCURACY FOR ROTATIONAL MOTION | LASER MEASUREMENT DEVICE | PRIMARY SPINDLE | WITHIN 40" (AMC) WITHIN 50" (BMC) | | (s) |

| MANAGEMENT No. OF MEASURING DEVICE | ROTATION AXIS LASER MEASUREMENT DEVICE | |
|---|---|---|
| | LINEAR AXIS LASER MEASUREMENT DEVICE | |

[TRANSMISSION] [RESET]

PRODUCTION CONTROL SYSTEM

BACKGROUND OF THE INVENTION

1. Field of the Invention

The present invention relates to a production control system which includes a plurality of terminals provided in production sites and a central processor connected to the terminals via a network for transmitting production control information stored in the central processor to the terminals.

2. Description of the Prior Art

For production control including production instruction management, process specification management and quality control, production instructions, for example, are conventionally prepared on the basis of a production plan with the use of a computer, and printed out in a predetermined format on paper media for preparation of production instruction sheets, which are in turn delivered to production sites.

For the process specification management, process specification sheets prepared by recording process specification information on paper media are delivered to the production sites and kept therein and, in an actual production process, preparatory operations and production operations are performed with reference to necessary process specification sheets. For the quality control, check sheets for inspective and confirmatory operations such as dimensional accuracy checks and operation checks are prepared and, in working sites, the inspective and confirmatory operations are performed with reference to the check sheets and the results thereof are recorded on the check sheets.

Where the production control is based on the production instruction sheets, the process specification sheets and the check sheets of paper media, however, it is necessary to keep these sheets in the production sites. Where process specifications are different from machine to machine, for example, management of a tremendous number of sheets is not easy. In the production sites, some operators may be unfamiliar with the management of the sheets, so that they are slow in retrieving a required process specification sheet. Therefore, an operation may be delayed, or erroneously performed on the basis of an improper process specification sheet. Further, the paper media is liable to be damaged or smudged.

In view of the foregoing, it is an object of the present invention to provide a production control system which ensures easy storage and management of information and prompt and proper retrieval of necessary information in production sites.

SUMMARY OF THE INVENTION

In accordance with the present invention to solve the aforesaid problems, there is provided a production control system, which comprises a plurality of terminals provided in production sites and a central processor connected to the terminals via a network, wherein the central processor comprises a production control information storage section which stores information on production control, and a data distributing section for retrieving production control information from the production control information storage section in response to a request from any of the terminals and transmitting the retrieved production control information to the terminal having requested the information.

In the production control system according to the present invention, the data distributing section retrieves the production control information from the production control information storage section of the central processor in response to the request from any of the terminals provided in the production sites, and transmits the retrieved production control information to the terminal having requested the information. Thus, the production control system can centrally manage the production control information on a paperless basis. Further, the necessary production control information can promptly and properly be retrieved simply by operating the terminals in the production sites.

The production control information stored in the production control information storage section may include production instruction information on production instructions and/or process specification information on process specifications and/or inspection information on inspections.

Particularly, where the production control information includes the inspection information, the data distributing section may be adapted to receive data indicative of results of an inspection carried out on the basis of the inspection information from any of the terminals, and the central processor may include an inspection result data storage section for storing the inspection result data received by the data distributing section. Thus, the inspection result data can easily be collected for centralized management thereof.

Where products to be produced with the aid of the inventive production control system are NC machine tools, it is preferred that the terminals are respectively incorporated in numerical controllers of the NC machine tools being assembled in an assembly line. With this arrangement, an assembly-line worker can display process specification information for an assigned operation on a display provided adjacent an NC machine tool and perform the operation with reference to the process specification information. Thus, the assembly-line worker can promptly obtain necessary information without loss thereby to reliably perform the assembling operation with a drastically improved working efficiency. Further, there is no need to separately install special-purpose terminals in the production sites, so that costs for system construction can be reduced.

The network may include not only a cable communication network but also a wireless communication network.

BRIEF DESCRIPTION OF THE DRAWINGS

FIG. 5 is an explanatory diagram illustrating further another exemplary display screen (process specification menu screen) to be displayed by the numerical controller according to the embodiment;

FIG. 6 is an explanatory diagram illustrating still another exemplary display screen (process specification sheet) to be displayed by the numerical controller according to the embodiment;

FIG. 8 is an explanatory diagram illustrating still another exemplary display screen (process specification sheet) to be displayed by the numerical controller according to the embodiment;

FIG. 9 is an explanatory diagram illustrating further another exemplary display screen (process specification sheet) to be displayed by the numerical controller according to the embodiment; and FIG. 10 is an explanatory diagram illustrating still another exemplary display screen (check sheet) to be displayed by the numerical controller according to the embodiment.

DESCRIPTION OF THE PREFERRED EMBODIMENT

Figure 1:
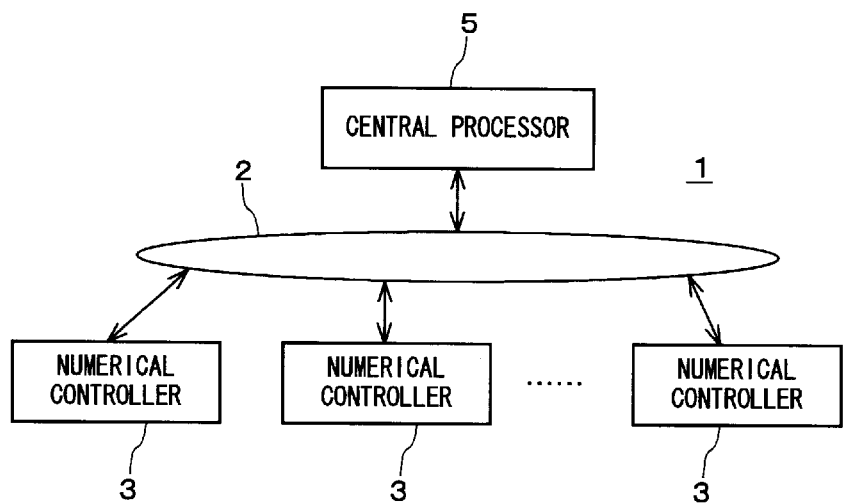
FIG. 1 is a block diagram schematically illustrating the construction of a production control system according to one embodiment of the present invention.
Figure 2:
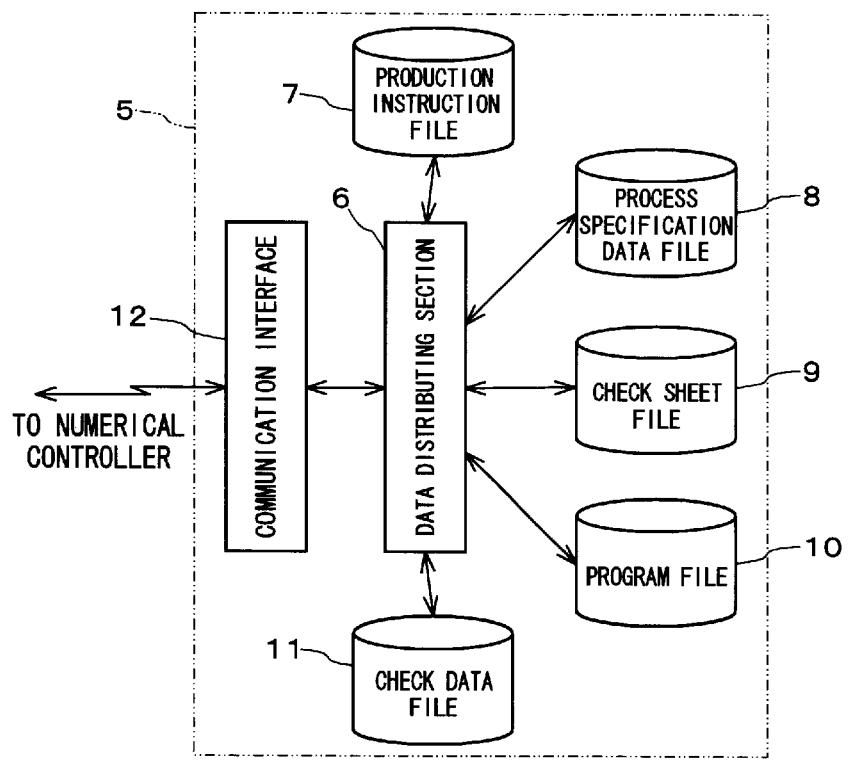
FIG. 2 is a block diagram schematically illustrating the construction of a central processor according to the embodiment.

With reference to the attached drawings, the present invention will hereinafter be described by way of a preferred embodiment thereof. FIG. 1 is a block diagram schematically illustrating the construction of a production control system according to this embodiment. FIG. 2 is a block diagram schematically illustrating the construction of a central processor according to this embodiment.

As shown in FIG. 1, the production control system 1 according to this embodiment is constituted by numerical controllers 3 of a plurality of NC machine tools provided in production sites, and a central processor 5 connected to the numerical controllers 3 via a network 2 such as a LAN. In this embodiment, the NC machine tools are currently assembled (in production) in an NC machine tool assembling line, and the numerical controllers 3 of the NC machine tools being assembled (in production) are connected to the central processor 5 via the network 2.

The central processor 5 includes an internet server such as a WWW server and CGI scripts, and functions as a server. The numerical controllers 3 each include a browser and function as a client.

As shown in FIG. 2, the central processor 5 includes a data distributing section 6 comprising a CPU, a ROM, a RAM and an auxiliary storage which stores predetermined processing programs, a production instruction file 7, a process specification data file 8, a check sheet file 9, a program file 10 and a check data file 11 each comprised of an auxiliary storage, and a communication interface 12. The central processor 5 is connected to the network 2 via the communication interface 12.

The production instruction file 7, the process specification data file 8 and the check sheet file 9 correspond to the production control information storage section stated in claim 1, and the check data file 11 corresponds to the inspection data storage section stated in claim 3.

The production instruction file 7 stores production instruction information which has been prepared on the basis of a production plan and is to be delivered to the production sites (e.g., production schedule data prepared for each machine model to be produced). The process specification data file 8 stores menu (list) information prepared for each machine model to be produced, and specific process specification data for respective items of the menu. The check sheet file 9 stores data of inspection items and tolerances prepared for each machine model to be produced. The program file 10 stores test cutting operation programs and test running operation programs. The check data file 11 stores inspection result data obtained as a result of an inspection.

The data distributing section 6 retrieves the production instruction information from the production instruction file 7, the process specification information from the process specification data file 8, and the inspection information from the check sheet file 9 in response to a request from any of the numerical controllers 3, and transmits the retrieved information to the numerical controller 3 having requested the information. The transmitted information is displayed on a display such as a CRT provided adjacent the numerical controller 3.

Figures 3, 4:
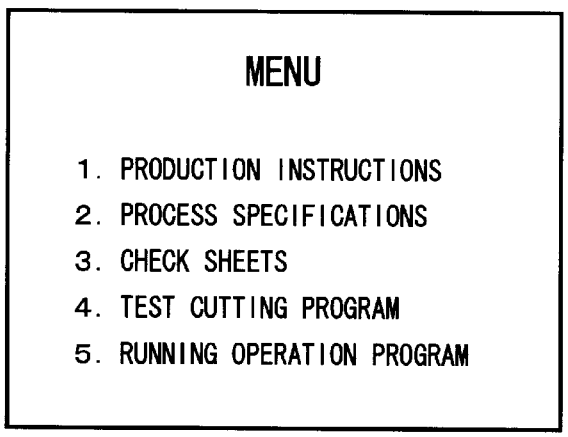
FIG. 3 is an explanatory diagram illustrating one exemplary display screen (menu screen) to be displayed by a numerical controller according to the embodiment.
FIG. 4 is an explanatory diagram illustrating another exemplary display screen (production instruction sheet) to be displayed by the numerical controller according to the embodiment.

More specifically, the data distributing section 6, when being accessed by the numerical controller 3 via the network 2, permits the numerical controller 3 to browse a web page, and displays a menu screen as shown in FIG. 3 on the display of the numerical controller 3. At the access, data of a machine model of the NC machine tool is transmitted from the numerical controller 3 to the data distributing section 6. When "1. PRODUCTION INSTRUCTIONS", for example, is selected in the menu screen displayed on the display of the numerical controller 3, a selection signal is transmitted from the numerical controller 3 to the data distributing section 6.

Upon reception of the selection signal from the numerical controller 3, the data distributing section 6 searches the production instruction file 7 on the basis of the machine model data of the NC machine tool to read out production instruction information for the machine model, then transmits the production instruction information thus read out to the numerical controller 3 having requested the information, and displays the production instruction information on the display of the numerical controller 3. An exemplary display screen of the production instruction information to be displayed is shown in FIG. 4. An assembly-line worker performs an operation in accordance with the production instruction information thus displayed.

When a selection signal for selection of "2. PROCESS SPECIFICATIONS" is inputted from the numerical controller 3, the data distributing section 6 searches the process specification data file 8 on the basis of the machine model data of the machine tool to read out menu information on process specifications for the machine model, then transmits the menu information thus read out to the numerical controller 3 having requested the information, and displays the menu information on the display of the numerical controller 3. An exemplary display screen of the menu information to be displayed is shown in FIG. 5.

Figure 7:
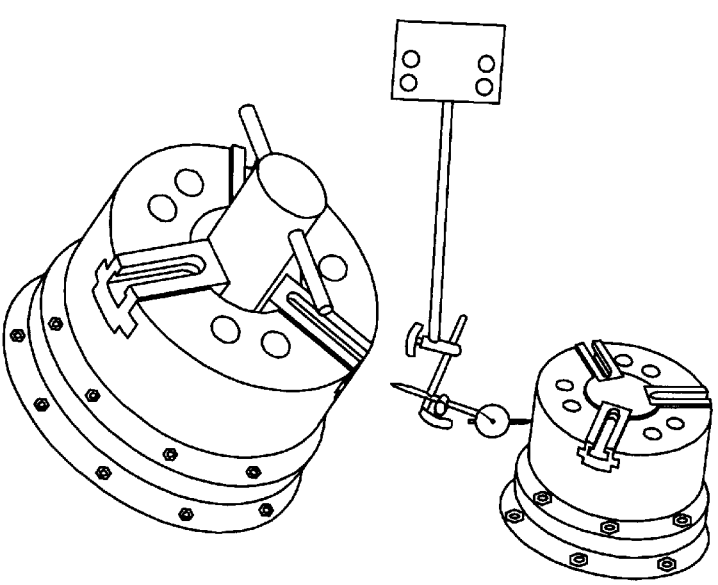
FIG. 7 is an explanatory diagram illustrating further another exemplary display screen (process specification sheet) to be displayed by the numerical controller according to the embodiment.

When a menu item is selected from the menu information and a selection signal is inputted from the numerical controller 3, the data distributing section 6 further searches the process specification data file 8 to read out requested process specification information, then transmits the process specification information thus read out to the numerical controller 3, and displays the process specification information on the display. When "1. WIRING" is selected in the menu shown in FIG. 5, for example, a display screen as shown in FIG. 6 is displayed. When "5. MOUNTING OF CHUCK" is selected, a display screen as shown in FIG. 7 is displayed. When "7-1. MEASUREMENT OF LINEAR AXIS POSITIONING ACCURACY" is selected, a display screen as shown in FIG. 8 is displayed. When "7-2. MEASUREMENT OF ROTATION AXIS POSITIONING ACCURACY" is selected, a display screen as shown in FIG. 9 is displayed.

Thus, the assembly-line worker can display process specification information for an assigned operation on the display provided adjacent the NC machine tool being assembled, and perform the assembling operation with reference to the displayed process specification information. The assembly-line worker can promptly obtain the necessary information without loss and, therefore, assuredly perform the assembling operation with a drastically improved working efficiency.

When a selection signal for selection of "3. CHECK SHEETS" in the menu screen shown in FIG. 3 is inputted from the numerical controller 3, the data distributing section 6 searches the check sheet file 9 on the basis of the machine model data of the NC machine tool to read out check sheet information for the machine model, then transmits the check sheet information to the numerical controller 3 having requested the information, and displays the check sheet information on the display. An exemplary display screen of the check sheet information to be displayed is shown in FIG. 10.

As shown in FIG. 10, the display screen contains information, such as inspection items, measuring instruments and tolerances, required for the inspection. The display screen contains input spaces A which accept inputs of inspection results. The worker performs inspecting operations in accordance with the check sheet information, and inputs the results of the inspection in the input spaces A. Upon completion of the input of inspection result data, the worker clicks a transmission button provided in a left lower corner of the display screen to transmit the inspection result data to the data distributing section 6. Then, the inspection result data is stored in the check data file 11.

When a selection signal for selection of "4. TEST CUTTING PROGRAM" or "5. RUNNING OPERATION PROGRAM" is inputted from the numerical controller 3, the data distributing section 6 searches the program file 10 on the basis of the machine model data of the NC machine tool to read out a test cutting operation program or a test running operation program, and transmits the operation program thus read out to the numerical controller 3 having requested the operation program. Then, the transmitted operation program is stored in a predetermined storage section of the numerical controller 3. Thus, the NC machine tool performs a test cutting operation or a test running operation in accordance with the received operation program.

In the production control system 1, as detailed above, the process specification information for the operation to be performed by the worker and the like information are displayed on the display provided adjacent the NC machine tool currently being operated by the worker and, therefore, the worker can promptly obtain the necessary information without loss to drastically improve the working efficiency. The worker can perform the operation with reference to the displayed process specification information, so that the operation is more reliable. Since the numerical controllers 3 serve as terminals, there is no need to separately provide special-purpose terminals. Accordingly, the costs for the system construction can be reduced.

The production control information such as the production instruction information, the process specification information and the inspection information can be handled on a paperless basis, so that the information can centrally be managed with ease. Further, the inspection result data is inputted from the numerical controllers 3 serving as the terminals and, therefore, can assuredly be collected. Thus, the inspection result data can centrally be managed with increased safety.

While one embodiment of the present invention has thus been described, it should be understood that the invention be not limited to the embodiment. Although the central processor 5 is connected to the numerical controllers 3 of the NC machine tools in the assembly line in the embodiment described above, the central processor 5 may be connected to numerical controllers of NC machine tools in a machining line to transmit production control information to the numerical controllers. Although the terminals are incorporated as the numerical controllers in the system, the terminals may be provided separately from the numerical controllers.

What is claimed is:

1. A production control system, comprising:
a plurality of terminals provided in a plurality of production sites; and
a central processor connected to the plurality of terminals via a network, wherein the central processor comprises:
a production control information storage section which stores information on production control; and
a data distributing section for retrieving production control information from the production control information storage section in response to a request from any of the terminals and transmitting the retrieved production control information to the terminal having requested the information,
wherein the terminals are each incorporated in a numerical controller of an NC machine tool being assembled.

2. A production control system as set forth in claim 1, wherein the production control information stored in the production control information storage section includes at least one of production instruction information on production instructions, process specification information on process specifications and inspection information on inspections.

3. A production control system as set forth in claim 1, wherein the production control information storage section stores at least inspection information,
wherein the data distributing section receives data indicative of results of an inspection carried out on the basis of the inspection information from any of the terminals,
wherein the central processor further comprises an inspection data storage section for storing the inspection result data received by the data distributing section.

* * * * *